No. 892,168. PATENTED JUNE 30, 1908.
A. W. LOVEJOY.
FOLDING COMBINATION POULTRY AND MERCHANDISE CRATE.
APPLICATION FILED JUNE 13, 1905. RENEWED APR. 20, 1907.
2 SHEETS—SHEET 1.
Fig. 1.
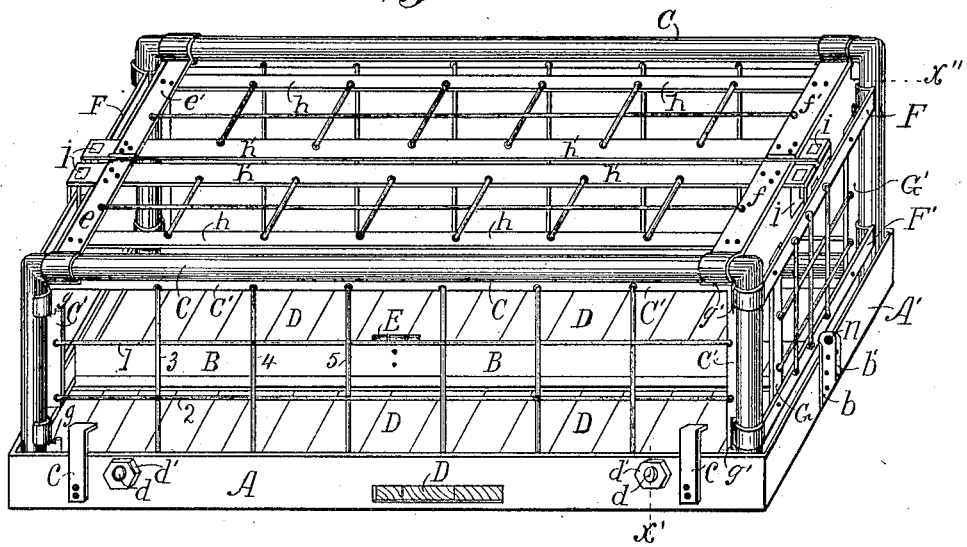
Fig. 2.
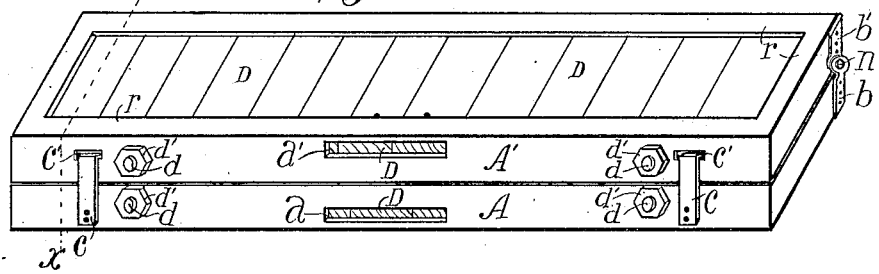
Fig. 3.
Witnesses:
S. C. Taylor.
Mary F. Lovejoy
Inventor.
By Andrew W. Lovejoy.
A. C. Marble
His Attorney.

No. 892,168. PATENTED JUNE 30, 1908.
A. W. LOVEJOY.
FOLDING COMBINATION POULTRY AND MERCHANDISE CRATE.
APPLICATION FILED JUNE 13, 1905. RENEWED APR. 20, 1907.
2 SHEETS—SHEET 2.
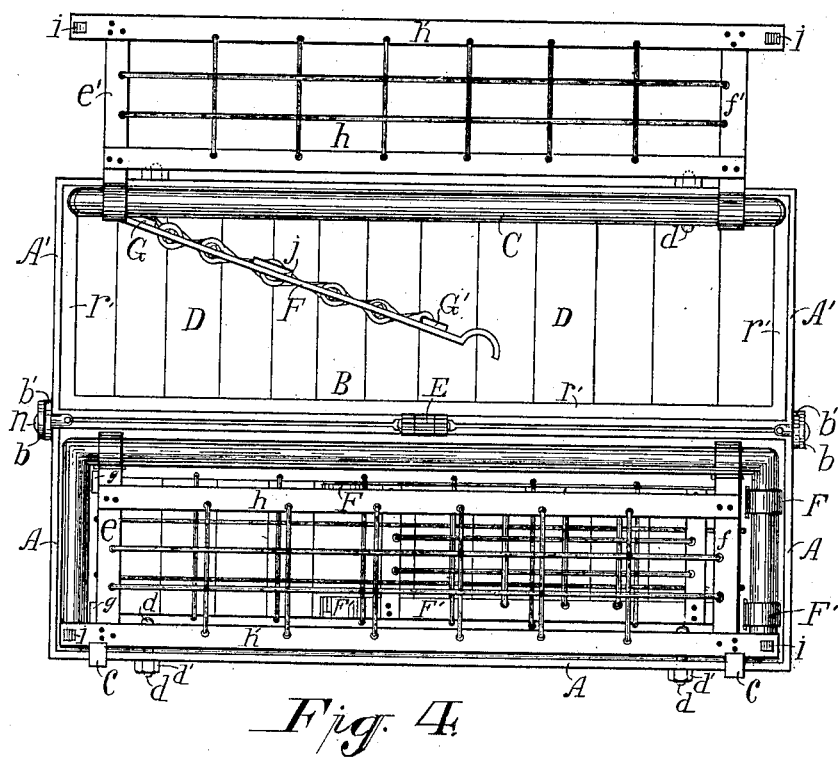
Fig. 4.
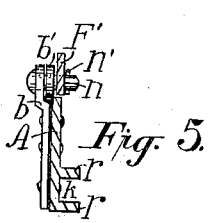
Fig. 5.
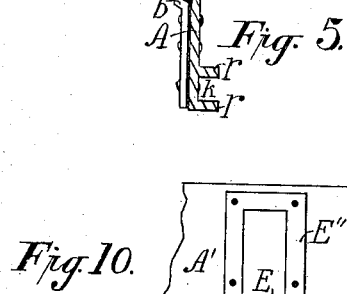
Fig. 6.
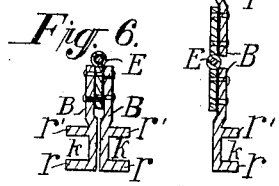
Fig. 8.
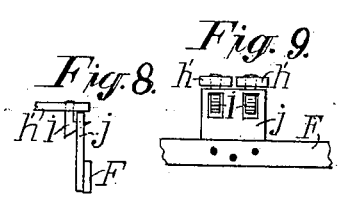
Fig. 9.
Fig. 7.
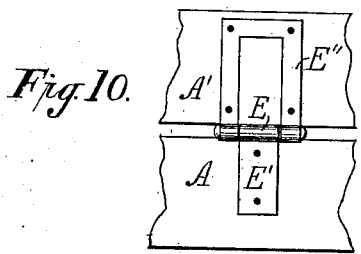
Fig. 10.
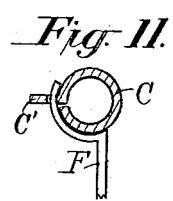
Fig. 11.
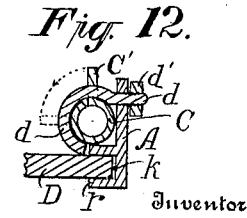
Fig. 12.
Witnesses
S. C. Taylor
Mary F. Lovejoy
Inventor
Andrew W. Lovejoy.
By A. L. Marble
His Attorney

UNITED STATES PATENT OFFICE.

ANDREW W. LOVEJOY, OF OKLAHOMA, OKLAHOMA, ASSIGNOR TO ARTHUR B. FONTAINE.

FOLDING COMBINATION POULTRY AND MERCHANDISE CRATE.

No. 892,168.  Specification of Letters Patent.  Patented June 30, 1908.

Application filed June 13, 1905, Serial No. 265,055. Renewed April 20, 1907. Serial No. 369,408.

*To all whom it may concern:*

Be it known that I, ANDREW W. LOVEJOY, a citizen of the United States, residing at Oklahoma city, in the county of Oklahoma, Oklahoma, have invented new and useful Improvements in Folding Combination Poultry and Merchandise Crates, of which the following is a specification.

My invention relates to folding crates for the transportation of poultry and merchandise, in which the base and cage portions are in duplicate sections each section of the cage portion being hinged in a manner adapted to fold compactly within the walls of its base section; the base sections being provided with floors and hinged in a manner that the upper edges of the base-sections fold together, thus forming a closure and inclosing the cage portion of the crate, all of which will hereinafter be fully explained.

The objects of my invention are; first, to provide a folding poultry and merchandise crate constructed in a manner adapted to withstand the hard usage such crates are subjected to during transportation by railway and otherwise, especially when the crates are empty; second, to minimize the dimensions of the crate when empty; third, to protect the cage portion from injury during its transportation and storage; fourth, to save cost in transportation and storage; fifth, to provide a crate which has in combination the qualities of strength, lightness and compactness. I attain these objects by the mechanism illustrated in the accompanying drawings, forming a part of this specification, in which—

Figure 1 is a perspective view of my folding combination poultry and merchandise crate as extended to its maximum dimensions; Fig. 2 is a view in perspective of the crate as folded to its minimum dimensions for transportation or storage; Fig. 3 is a transverse sectional elevation on line $x\ x$ Fig. 2; Fig. 4 is a plan view of the crate showing one section of the cage portion as folded and the other partly folded; Fig. 5 is a view in elevation of the left base hinge with a section of the base frame, also a section of the lower end-gate-bar through which the hinge-pin passes; Fig. 6 is a transverse sectional elevation of the central hinge of the base-frames in the position of Figs. 1 & 4; Fig. 7 is an enlarged view of the central hinge in cross-section as when the crate is folded; Fig. 8 is a front elevation and Fig. 9 is an end elevation of the lid or cover-latch as in active use; Fig. 10 is an elevation of the central base-frame-hinge as viewed from the rear in Fig. 2, enlarged; Fig. 11 is sectional plan view of one of the corner posts on line $x''$ Fig. 1; Fig. 12 is a sectional elevation on line $x'$ of Fig. 1.

Similar letters refer to similar parts in the several views.

Referring to the drawings, A and A' are the rectangular base frames, having their floors D D removably secured therein by means of the inwardly projecting foot or flange $r$ and the rib $r'$ forming a part of the base frames, to which the folding side frames C C are attached by the hook-like hinge-bolts $d$ provided with nuts $d'$ designed to take up all slack and hold the said side-frames rigidly upright while in active use and also permit them to fold inwardly and down upon the floors D D. The said side-frames consist of tubes having inwardly projecting flanges C', constructed in this manner to afford great strength and little weight combined, the flanges being perforated to receive the netting wires 1 2 3 4 etc. as shown in Fig. 4.

The flanges C' of the side-frames are mortised at $g'$ to permit the ends of the gate-bars F and F' to encompass the front-right and the rear-left end members of the side-frames thus forming the hinges of the gate-like ends of the cage portion of the crate, which are composed of the said bars F and F' having secured thereto the vertical cross-bars G and G', forming rectangular frames to which the netting-wires are attached. The said gate-bars have their loose ends bent in a curve to form a shoulder and engage the free corner posts, the under edges of the curved portion of the gate-bars being notched to engage the flanges C' where they are cut away at $g$ to aid in securing the side-frames C rigidly upright while the crate is in active use. Midway the cross-bar F' is a perforation adapted to receive the hinge-pin $n$, which passes through the hinge-plates $b$ and $b'$ and through the said cross-bar F' and is secured in place by the cotter-pin $n'$, while the crate is in service.

The crate top consists of two similar rectangular frames, having hinge-bars $e\ e'$ and $f\ f'$ one end of each encompassing the cross-bar portion of the side-frames, near the ends thereof, the flanges C' being mortised or perforated as at $g'$, Fig. 1, to permit said encompassing. To the said hinge-bars are firmly and laterally secured the longitudinal lid-frame bars $h\ h$ and $h'\ h'$; to these bars of the lid-frames the netting wires are attached in the usual way; see Figs. 1 and 4.

To hold the lids down while the crate is in active service the two central bars $h'\ h'$ have near their outer ends the downwardly pending latch-lugs $i$, adapted to engage openings provided for that purpose in the lid-supporting plates $j\ j$ which are firmly secured to the upper end-gate-bars F F, see Figs. 8 & 9.

Referring to the base-frames more in detail, they are constructed of rolled iron or steel having a form peculiar *per se*, a vertical member B, an inwardly projecting foot or flange $r$, and a rib $r'$, which with the aid of the foot $r$, form the floor seat $k$; the base-frames being continuous and unbroken, the openings $a$ and $a'$ are provided for inserting the sections of the floor D, which being short may be thin and light, and by means of said openings any damaged sections of the floor may be removed and replaced by new ones, the last section being secured by a nail, a rivet or by any convenient means. The hinge-plates $b$ and $b'$ are secured to the outer surface, near the inner corners, of the base-frames A and A′, and are provided with hinge bolts or pins $n$, one end having a head thereon and the other end having a hole adapted to a cotter-pin $n'$, the said hinge-bolts or pins $n$, passing through the hinge-plates $b$ and $b'$ and through the lower end-gate-bar F′ while the crate is in active service, to aid in securing the end-gate in place and prevent the central portion of the crate from sagging, see Figs 1 & 5. To afford additional firmness to the crate the central hinge E is provided, having its members E′ and E″ riveted to the vertical members B, of the base-frames as shown in Figs. 3, 6, 7 & 10.

When the crate is folded for transportation or storage, as shown in Fig. 2, it is secured in such position by the two flat longitudinal springs $c\ c$, having their lower ends attached to the front of the base-frame A, their upper ends terminating in right-angle projections adapted to enter the slots $c'\ c'$, the tension of the said springs holding them in place. To prepare the crate for storage or for empty shipment, take the crate as shown in Fig. 1; spring the upper gate-bars F outward until the lids become unlatched and free to be turned over against the outer sides of the side-frames; remove the cotter-pins $n'$, and swing the end-gates inwardly and against the side-frames; fold the side-frames inwardly and down; fold the base-frame A′ over and upon the frame A, as shown in Fig. 2. For convenience in filling the crate with merchandise both lids may be opened, and for poultry, either one may be used, or a small door may be placed in either lid.

Having thus described my invention, what I claim as new and useful and desire to secure by Letters Patent, is—

1. In a folding poultry and merchandise crate, the combination of two similar rectangular base-frames A and A′, each frame being integral as a frame, but composed of the vertical member B, the right-angled foot or flange $r$ and the inwardly projecting rib $r'$, forming the floor seat or groove $k$, adapted to receive the floors D D, the said frames being provided with floor-inserting slots $a$ and $a'$, and perforations adapted to the hinge-bolts $d$, one of the said frames having locking slots $c'\ c'$ adapted to receive the hooked end of the springs $c$, attached to the corresponding portion of the other base-frame, both being provided with hinges in a manner to fold one upon the other, as shown and for the purposes specified.

2. In the combination of a folding poultry and merchandise crate having two similar base-frames provided with floors and hinged together in a manner adapted to fold one upon the other forming a closure within which the cage portion of the crate is folded during storage and empty shipment, the rectangular flange-tubing side-member frames C, hinged to the inner portion of the outer walls of the base-frames A and A′, by the hooked bolts $d$, the said side frames, when vertical, forming the corner posts and plates of the cage portion of the crate, the right front and left rear corner posts having hinged thereto the horizontal bars F and F′ of the gate-end members of the cage portion of the crate, the loose and of the end-gate bars F and F′ being adapted to latch into the flange C′ of the opposite post, substantially as described.

3. In a poultry and merchandise crate, the crate lid consisting of two like sections having hinge-bars $e\ f$ and $e'\ f'$ hinged to the plate portion of the side-frames, and having longitudinal bars $h\ h$ and $h'\ h'$ secured to the said hinge-bars forming rectangular frames to which are attached the netting wires, the more central bars $h'$ being the longer and having secured near their ends the downwardly projecting latching-lugs $i$, as set forth.

4. In a folding poultry and merchandise crate having two like base-frames A and A′ hinged together in a manner to fold one upon the other, the spring latches $c\ c$ secured to the face of the base-frame A and latching into the slots $c'\ c'$ in the base-frame A′, as set forth.

5. In a folding poultry and merchandise crate having two similar base-frames and two similar flanged-tubing side members hinged thereto and in active service forming the corner posts of the cage portion of the crate, the swinging gate-ends consisting of the horizontal hinge-bars F and F′, one end of each being adapted to encompass one of the vertical portions of one of the side-frames, their opposite ends being adapted to brace and latch the vertical portion of the opposite side-frames, the vertical stay-bars G and G' being secured to the hinge-bars forming rectangular frames having netting wires attached thereto, the lower hinge-bars F' being properly perforated for the hinge-pin $n$ and the upper hinge-bar F having secured thereto the upwardly extending lid-supporting plate $j$ provided with openings adapted to receive the points of the latching-lugs $i$, for the purposes set forth.

6. In a folding crate, a relatively stout bottom composed of sections joined to fold together, and a relatively fragile folding cage structure, connected with said bottom structure, arranged when folded to lie with all its members between and be protected by the bottom sections.

7. In a folding crate, a bottom composed of two sections hinged together to fold one over the other in interspaced relation, and a folding cage structure comprising sides, top, and ends, arranged when open to interlock, and when folded to lie within the space between the bottom sections.

8. In a folding crate, a bottom composed of two sections hinged to fold together with their upper faces inward, sides hinged to the bottom, and ends hinged to the sides, said sides and ends being arranged to interlock when open, and when closed to lie upon the upper face of the corresponding bottom section, to be folded in between the bottom sections.

9. In a folding crate, a bottom composed of two sections hinged together to fold one over the other, a side member hinged to the free edge of each bottom section, end members hinged to opposite ends of the two side members, a section of a top member hinged to the free edge of each side member, said side and end members being arranged to interlock when open to form a cage upon the open bottom and supporting the top, and all of said cage members being arranged when closed to fold between and be protected by the bottom sections.

10. In a folding crate, a bottom composed of sections hinged to fold together by downwardly breaking hinges, a folding cage associated with the bottom, arranged when open to form a structure relatively rigid in every direction, and when folded to lie with all its members between the bottom sections; and means for connecting a cage part and a bottom part to prevent breaking down of the bottom at the hinges when the crate is open.

11. In a folding crate, a bottom composed of sections hinged to fold together with their upper surfaces inward, a folding cage carried by said bottom, comprising sides hinged to the free edges of the bottom sections, and ends hinged to corners of the side members, said parts being arranged to interlock when open, and when closed to lie wholly between the hinged bottom sections and parts on the bottom structure and an end member interengaging when the crate is open to lock the bottom against breaking down at the hinges.

12. In a folding crate, a bottom composed of sections, hinges therefor having their pins in a longitudinal axis above the upper face of the bottom when open, and projecting beyond the hinge leaves, and a folding cage comprising interlocking parts including end gates providing parts for engaging the hinge pins when the cage is open.

13. In a folding crate, a bottom composed of like sections hinged together by downwardly breaking hinges, each such section having a metallic frame and wood flooring carried by such frame; and a cage structure, comprising sides, each having an edge frame of flanged tubing and a netting of wire connected to the flanges of such tubing, end and bottom members, all of said cage parts being arranged for interconnection when open, and to fold between and be protected by the bottom sections when closed.

14. In a folding crate, a bottom composed of two sections hinged together on a longitudinal axis, side members hinged to opposite free edges of the bottom members, each comprising flanged tubing corner posts and top rail, and wires connecting the flanges to form a netting, and end members hinged to diagonally opposite corner posts, each providing hinges embracing the tubular portion of the post, and each at its opposite end arranged for engagement in an aperture in the flange of the opposite post.

In testimony whereof I affix my signature, in presence of two subscribing witnesses.

ANDREW W. LOVEJOY.

Witnesses:
 B. E. CHAPIN,
 T. H. SHIPP.

Correction in Letters Patent No. 892,168.

It is hereby certified that Letters Patent No. 892,168, granted June 30, 1908, upon the application of Andrew W. Lovejoy, of Oklahoma, Oklahoma, for an improvement in "Folding Combination Poultry and Merchandise Crates," were erroneously issued to "Arthur B. Fontaine," as assignee of said invention; whereas said Letters Patent should have been issued to the inventor, the said *Andrew W. Lovejoy*, as owner of the entire interest in said invention; and that the said Letters Patent should be read with this correction therein that the same may conform to the record of the case in the Patent Office.

Signed and sealed this 25th day of August, A. D., 1908.

[SEAL.]

C. C. BILLINGS,
*Acting Commisssoner of Patents.*